United States Patent [19]
Ohta

[11] 3,935,589
[45] Jan. 27, 1976

[54] COLOR TELEVISION SIGNAL GENERATOR

[75] Inventor: Takahiro Ohta, Asaka, Japan

[73] Assignee: Fuji Photo Film Co., Ltd., Minami-ashigara, Japan

[22] Filed: Oct. 24, 1972

[21] Appl. No.: 300,061

[30] Foreign Application Priority Data
Oct. 22, 1971 Japan.............................. 46-83786
Oct. 22, 1971 Japan.............................. 46-83788
Oct. 22, 1971 Japan.............................. 46-83789

[52] U.S. Cl................................... 358/54; 358/64
[51] Int. Cl.²........................................ H04N 9/02
[58] Field of Search ............ 178/DIG. 28; 358/1, 64, 358/54, 66, 67, 69, 76

[56] References Cited
UNITED STATES PATENTS

| | | | |
|---|---|---|---|
| 1,934,821 | 11/1933 | Rudenberg............................. | 178/6 |
| 2,552,070 | 5/1951 | Sziklai................................... | 178/5.4 |
| 2,954,424 | 9/1960 | Thiele................................... | 358/69 |
| 3,001,012 | 9/1961 | Braicks................................. | 178/5.4 |
| 3,075,432 | 1/1963 | Myers.................................... | 178/5.4 ST |
| 3,444,413 | 5/1969 | Harrold................................. | 178/5.4 F |
| 3,506,778 | 4/1970 | Gold et al............................. | 178/5.4 |
| 3,619,484 | 11/1971 | Tanaka et al......................... | 178/5.2 R |
| 3,719,771 | 3/1973 | Eto et al............................... | 178/5.4 ST |
| 3,745,234 | 7/1973 | Szymber................................ | 178/5.2 R |
| 3,770,882 | 11/1973 | Szymber................................ | 178/5.2 A |
| 3,851,094 | 11/1974 | Sasabe.................................. | 178/6.8 |

FOREIGN PATENTS OR APPLICATIONS
8,699   3/1970   Japan

OTHER PUBLICATIONS
B 344,203 U.S. Published Patent Application, Sasabe, Published, Jan. 28, 1975.

Primary Examiner—Richard Murray
Assistant Examiner—Michael A. Masinick
Attorney, Agent, or Firm—Sughrue, Rothwell, Mion & Zinn

[57] ABSTRACT

A color television signal generator includes a novel cathode-ray tube whose spot varies in chromaticity regularly during horizontal scanning of an electron beam. The chromaticity variable spot is focused on a color recording medium to be imaged and a resulting light is detected by a single photoelectric converter to provide a color signal.

32 Claims, 17 Drawing Figures

COLOR TELEVISION SIGNAL GENERATOR

BACKGROUND OF THE INVENTION

This invention relates to a color television signal generator utilizing a novel flying-spot scanner and providing a color television signal from color documents.

More particularly, it relates to a color television signal generator operable in a manner such that a television raster is produced by a cathode-ray tube of the type wherein its flying-spot is regularly varied in chromaticity during horizontal scanning of an electron beam, the raster is focussed on a recording medium having recorded color pictures by means of an optical system, and the resulting transmitted or reflected light is detected by a single photoelectric convertor. As occasion arises, a chrominance signal separation process may be effected.

DESCRIPTION OF THE PRIOR ART

In the prior art, several types of devices exist which generate a color television signal from color films. One of such conventional devices is a three-tube color television camera wherein a three-primary-color picture is focussed by an imaging lens system and a three-color separating optical system on the faces of the three imaging tubes to obtain video signals of three colors. The video signals are then processed by a color encoder to obtain a composite color signal. According to the above system, complicated elements are needed such as a three-color separating system and three lines of imaging tubes, making such devices expensive and bulky, and high skill is requiring to obtain an exact registration of a three-color image. Therefore, this type of device cannot be adapted to general and domestic use.

A system utilizing a flying-spot scanner is also known in which a television raster is formed on a cathode-ray tube face, its white light spot is focused on a color film, and the resulting transmitted light is detected by three photodetectors (generally, photomultipliers) which include dichroic filters to provide color video signals. This system is superior to the first-described system utilizing a three-tube television camera in that no registration is needed. Thus, such a system is comparatively well suited for the generation of a color video signal from color film. However, bulky dichroic optical systems, three lines of photodetectors, and associated amplifiers and high-voltage power sources are required, resulting in difficulty in making such devices compact.

As a third known system to generate color signals, a single-tube color television camera was developed which employs an optical system or a color stripe filter unit to effect multiplex-processing of a chrominance signal in a spatial frequency range. To effect multiplexing a dichroic stripe filter unit was used, and frequency-multiplexing and phasemultiplexing techniques have been used. The former technique is discussed in Japanese Pat. Publication No. 5170/1965 and is characterized by the fact that an object picture is focused through two kinds of stripe filter units of different spatial frequencies on a photocathode to achieve frequency separation. Several modifications of this type of system are also known. The latter technique is characterized by the fact that it employs three-primary-color stripe filters arranged in a predetermined order and separates a signal obtained during horizontal scanning in terms of the phase of the signal.

In the single-tube television camera system, because a single tube is employed there is no need to control registration and such a system can be embodied in a small, simple color camera in comparison to a three-tube color camera.

Recently, imaging-tubes with integrated stripe filters were developed whereby the optical system was simplified and the dimensions of the system could be miniaturized. On the other hand, in order to spatially effect frequency-multiplexing on the photocathode of the imaging tube, it is necessary to enhance the response characteristics of the imaging tube. However, present imaging tubes have a limitation on their resolving power, so one cannot obtain a reproduced television image which is satisfactory from the viewpoint of resolving power, color distortion and the like. Further, in imaging the color film a source of light is necessary to heavily illuminate the color film, and this results in the problem of color degradation of the film and the like.

SUMMARY OF THE INVENTION

According to the present invention, there is provided a color television signal generator for the reproduction of color movie films and color documents which includes a novel cathode-ray tube, an optical system to focus the raster generated on the cathode-ray tube face on a color recording medium to be imaged, and a single photoelectric converter to detect light from the recording medium.

The cathode-ray tube is designed so that its flying-spot regularly varies in chromaticity during horizontal scanning of an electron beam. Specifically, the face plate member of the cathode-ray tube includes a color light emitting means which is responsive to the scanning of the electron beam.

The color light emitting means comprises a white phosphor layer and a color separation filter stripe layer applied on the white phosphor layer, or a color phosphor layer. Either the color separating filter stripe layer or the color phosphor layer consists of a repetitive series of parallel color filter stripes arranged in a direction crossing the horizontal scanning direction of the electron beam, wherein the width and order of arrangement of the stripe members of two to six colors are predetermined to that the output of a photoelectric converter responsive to light from the color recording medium illuminated by the chromatically varying spot can be utilized as a color television signal.

According to a first feature of the present invention, the output signal of the photoelectric converter is separated in terms of frequency or phase into color signal components.

According to a second feature of the present invention, the output of the converter is utilized per se as a color television signal because the stripe members provided on the face plate of the cathode-ray tube are designed to generate a spot whose color light components have a frequency, phase and intensity substantially identical to those of the corresponding color signal components of the ideal chrominance subcarrier signal of the NTSC color television system. Thus, in the second feature of the present invention, no chrominance signal separating circuit is required.

It is a general object of the present invention to overcome the shortcomings of conventional prior art color television signal generators by providing a novel, compact, light-weight color television signal generator.

It is a first specific object of the present invention to provide a novel color television signal generator including as a flying-spot scanner using a novel cathode-ray tube designed so that its spot regularly varies in chromaticity during horizontal scanning of an electron beam.

It is a second specific object of the present invention to provide a novel color television signal generator as described above employing only one photoelectric converter.

It is a third specific object of the present invention to provide a novel color television signal generator including a novel cathode-ray tube functioning as a color encoder as well as a flying-spot scanner, and providing a color video signal analogous to the standard NTSC color television signal.

It is a fourth specific object of the present invention to provide a novel color television signal generator for directly generating a color television signal from color movie films and color documents.

It is a fifth specific object of the present invention to provide a novel color television signal generator as described above including a multi-sided rotary prism for frame conversion from color movie film to a television image.

It is a sixth specific object of the present invention to provide a novel cathode-ray tube for the generation of a color television signal from color movie film and color documents whose spot regularly varies in chromaticity during horizontal scanning of an electron beam.

It is a seventh specific object of the present invention to provide a novel cathode-ray tube functioning as a color encoder as well as a flying-spot scanner generating the spot whose color varies regularly in response to scanning of an electron beam, whereby the emitted light includes color components which each have a predetermined frequency, phase and intensity corresponding substantially to those of corresponding color signal components of the ideal chrominance subcarrier signal of the NTSC color television signal.

DETAILED DESCRIPTION OF THE INVENTION

Now, at first, a first embodiment of the present invention will be described with reference to FIGS. 1 to 7.

A first embodiment of the present invention comprises a cathode-ray tube including a face plate member consisting of a white phosphor layer and a dichroic stripe filter layer, or consisting of a striped color phosphor layer, which effects spatial frequency multiplexing of color signals, a deflector to generate a raster, an optical system to focus a flying spot or raster on a color document, a single photoelectric converter to detect light transmitted through or reflected by the color document, and a chrominance signal separating circuit to provide a set of color signals. As occasion arises, there may additionally be provided a gamma correction circuit to compensate for nonlinearity belonging to CRT and the color document and a color correction circuit to improve the color reproduction characteristics of the system.

Figure 1:
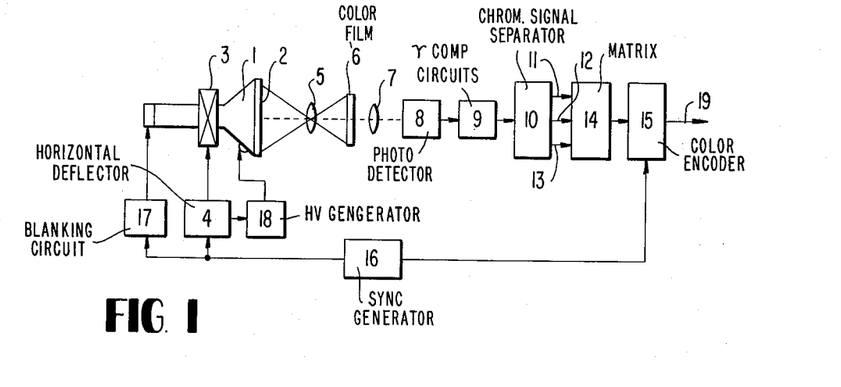
FIG. 1 is a block diagram of a first embodiment of a color television signal generator according to the present invention.

Referring to FIG. 1, the cathode-ray tube 1 illustrated differs from a conventional cathode-ray tube in the structure of the face plate member which effects spatial frequency multiplexing of color signals on the face plate. The cathode-ray tube usable in the present invention has a face plate member 2 including, for example, a white phosphor layer and a striped color separating filter layer. Raster scanning of an electron beam is achieved by a vertical and horizontal deflector 4 and a deflecting coil 3, and the flying spot is focused by means of a lens system 5 on a color film medium 6. In this case, the spot is varied in chromaticity by means of the stripe filters. The light transmitted through the color film 6 is led to a photo detector 8 by a focusing lens system 7. A synchronizing signal generator 16 supplies signals to the deflector 4 and, through a blanking circuit 17, to a cathode of the cathode-ray tube. The device further includes a high-voltage generator 18. The foregoing arrangement and resulting operation are analogous to those of a conventional flying-spot scanner. However, in the present invention, as the white light spot generated in the cathode-ray tube moves in the horizontal direction, it traverses the dichroic stripe filters disposed and arranged in a direction crossing the spot scanning direction, so that the chromaticity of the spot varies. The frequency fc (KHz) of this color variation is determined in accordance with the following equation by the width $d$ (mm) of the stripe filters and the space therebetween, the horizontal scanning frequency (15.75 KHz in the NTSC color television system) and the horizontal deflection width D (mm) on the cathode-ray tube face:

$$fc = \frac{D/\alpha}{2d} \times 15.75 \text{ KHz} \qquad (1)$$

where the pitch or repetitive cycle of the stripe filters having a width $d$ is taken to be "$2d$", and $\alpha$ designates the ratio (about 83% in the NTSC color television system) of the effective scanning time (exclusive of the retrace period) to the total horizontal scanning time period.

Since the color film 6 is scanned by the flying spot light of varying chromaticity, the signal obtained by detecting light transmitted through the film has been further modulated by the color pictures provided on the color film 6. The signal detected is then applied through a gamma compensating circuit 9, which compensates for the gamma property of CRT and the color film, to a chrominance signal separating circuit 10 whereby three primary color video signals reflecting the scanned picture of the color film are obtained. That is, one can obtain a video signal 11 representing red, a video signal 12 representing green and a video signal 13 representing blue. These video signals are in turn applied to a matrix circuit 14 and an NTSC color encoder 15 to obtain an NTSC color television signal 19. As occasion arises, a color correcting matrix circuit may be added to correct the color-mixing property arising from the color film to be imaged. Further, if the output signal is modulated by the carrier frequency of any unoccupied TV channels and coupled to an antenna terminal of a standard color television receiver, one can obtain a color display on the receiver screen.

There are several systems to separate the chrominance signal, depending upon the arrangement of the dichroic stripe filters provided on the cathode-ray tube face. Generally, they can be classified into two classes: a frequency separation system and a phase separation system.

In the frequency separation system, a dichroic stripe filter unit consisting of cyan (red cut-off) stripe filters and yellow (blue cut-off) stripe filters of different pitches overlapped one upon the other is employed, whereas in the phase separation system, a filter unit consisting of blue, green and red dichroic stripe filters arranged side-by-side is employed.

Figure 2:
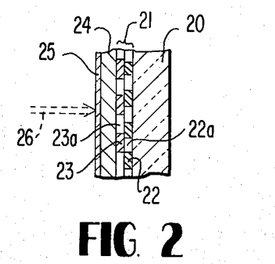
FIG. 2 is a schematic view of an exemplary arrangement of a face plate member of a cathode-ray tube of the type wherein a detected signal is processed in accordance with a frequency separation technique.

FIG. 2 shows an exemplary arrangement of a face plate member of a cathode-ray tube utilizable in the frequency separation system. Inside a glass face plate 20 of a cathode-ray tube there is provided a dichroic stripe filter layer 21. Layer 21 consists of two stripe layered sections: one consisting of cyan stripes 22 and transparent stripes 22a and the other consisting of yellow stripes 23 having a pitch different from that of the cyan stripes, and also comprising transparent stripes 23a. If each stripe layered section, the width of the transparent stripes is the same as that of the color stripes. These stripe filters are arranged in a direction crossing the horizontal scanning direction of the electron beam 26, typically, in a direction normal to the horizontal scanning direction. Layer 24 is a phosphor layer which emits white light with short duration less than one micro second. Such phosphor layer can be used for a conventional flying spot scanner of color television set. An aluminum back layer 25 is applied to the assembly.

When the electron beam 26 is scanned in the cathode-ray tube to generate a raster, the white light spot on the phosphor layer 24 yields, outside the tube, "luminescence" that has been modulated by the dichroic stripe filter unit. Specifically, the red light component of the white light is modulated by the cyan stripe filters 22 and the blue light component by the yellow stripe filters 23. Since the cyan stripe filters and yellow stripe filters differ in pitch, corresponding color-variation frequencies of the spot will differ from each other. However, the green light passes through both kinds of stripe filters, so it is not modulated.

Figure 3:
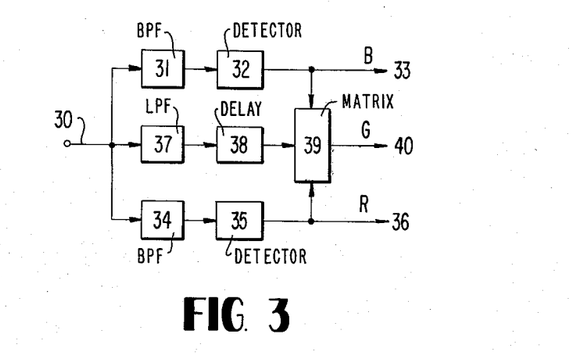
FIG. 3 is a block diagram of an exemplary chrominance signal separating circuit employed in a frequency separation system.

When the above-described cathode-ray tube is employed as as flying-spot scanner, the color-variable spot on the tube face is focused through a lens system on the color film and the light transmitted from the film is further modulated by the elements of the color picture on the color film. That is, the light from blue picture elements is modulated at a frequency determined by the yellow stripe filters and the light from red picture elements is modulated at a frequency defined by the cyan stripe filters, which frequency is different from the frequency relating to the yellow stripe filters. The difference in frequencies can be separated by a filter and be larger than the band width of red and blue signals. The light from the green picture elements is modulated only by the respective picture elements and not by the stripe filters. A signal 30 obtained from a photodetector receiving such light is a composite signal representative of all of the above light components. FIG. 3 shows an exemplary circuit to separate signal 30 into its respective color signals.

In FIG. 3, the signal 30 obtained by detection of the light is, after being amplified if necessary, applied to a first band-pass filter 31 which can pass signal components only in the frequency band associated with the yellow stripe filters and then to a first detector 32 which effects envelope demodulation whereby a B signal 33, representative of the blue picture elements, is obtained. Similarly, a second frequency band-pass filter 34 and a second detector 35 derive an R signal 36. By means of a low-pass filter 37, a signal is obtained which is primarily representative of green which is not modulated by the stripe filters. The output signal of the filter 37 is applied through a delay circuit 38 to a matrix circuit 39 where the B and R signal components of the input signal are removed, whereby a G signal 40 representative of green is obtained.

Due to the fact that the human eyes resolving power relative to blue and red on either end of the visual spectrum is poor in comparison to green resolution, the band width of the blue and red signals is sufficient even though it is narrowed. Typically, it is 0.5 MHz.

In general, the primary factor determining the resolving power of the reproduced television image is the band width of the signal mainly representative of green. In the afore-mentioned frequency multiplexing system employing the imaging tube with the stripe filters provided on the photocathode, because the resolving power of the imaging tube (typically, a Vidicon) is somewhat limited, the band width of the low frequencies is on the order of 2.8 MHz and respective color carrier frequencies are approximately 3.3 MHz and 3.9

MHz. In one comparatively improved system, they are 3.9 MHz and 51.0 MHz. In such cases as above, the composite signal 30 contains three kinds of signal components divided into respective frequency bands, so that the width of each band cannot be widened enough, and they are close to one another. As a result, the drawback is encountered that high frequency components reflecting the picture to be imaged are mixed in the color signal, thus generating a false color signal. Generally, an optical lowpass filter member including a lens such as a lenticular lens or an optical fibre plate is used to prevent generation of such a false color signal.

According to the present invention, the above drawback can be obviated by a frequency multiplexing optical member or stripe filter unit provided on a face of the cathode-ray tube. The diameter of the cathode-ray tube is larger than that of the photoelectric surface of the Vidicon used for the aforementioned single-tube color camera. That is, the present invention can economically provide a small 3-inch cathode-ray tube, the spot diameter of which is smaller than 50 microns over the total raster area. In the above exemplary tube size, since the useful diameter of cathode ray tube is 67 mm., the dimension of the raster is 40.2 × 53.6 mm based on the television aspect ratio 3:4. Further, the frequency boundary of the video signal can be calculated by the resolving power on the cathode-ray tube face as follows:

$$\frac{53.6 \text{ mm} / 0.83}{50 \mu \times 2} \times 15.75 \text{ KHz} \approx 10.0 \text{ MHZ}$$

This can be derived from the aforedescribed generic formula (1). Here, parameters relating to an exemplary system including a 3-inch cathode-ray tube are assumed to be such that a lowpass filter does not pass frequencies higher than 4 MHz, the width of the yellow stripe filters is 85 microns, the width of the cyan stripe filters is 73 microns, and the blue and red carrier frequencies are approximately 6 MHz and 7 MHz, respectively. Thus, the band width of the respective signals becomes sufficiently wide, and it is possible to maintain a wide space between adjacent bands in order to prevent high frequency components from mixing into the color carrier bands. However, a great deal of consideration should be paid to determining the frequency bands, because the signal-to-noise ratio of the image will be remarkably deteriorated if these bands step in a frequency range reflecting the granularity of the color film to be reproduced (that may depend mainly upon color element). The whole resolution power through 8 mm movie film and movie cameras on the market is about 70–80 line pairs/mm and this causes 7~8 MHz in frequency on television scanning. Therefore, in the case of the reproduction of 8-mm films or smaller the color carrier frequency should be lowered even further.

Several methods of producing the dichroic strip filters on the face plate of the cathode-ray tube have been proposed, but the methods which use an organic material as a filter substance are not suitable because in the step of manufacturing a phosphor layer and an aluminum-back layer in the cathode-ray tube, a burning operation is performed at elevated temperature, thereby volatilizing organic binders. The stripe filter unit that is preferably employed in the present invention is the so-called dichroic filter, which may include about 5 to 11 layers of two different kinds of materials produced through an evaporation process and overlapped alternately one upon another, wherein the first type of layer is made of a material of large refractive index such as a transparent metal sulphide, for example ZnS or transparent metal oxide, for example, $CeO_2$, $ZrO_2$, $TiO_2$ and the other type of layer is made of a material of smaller refractive index such as a transparent sodium compound, for example, $MgF_2$, $CeF_3$, $Na_3AlF_6$ etc. In the above type of filter, a desired filter body that transmits only an intended color can be obtained by controlling the thickness of each layer element. Usually a single filter body is produced in the manner described above and divided into separate stripe pieces through mechanical working or photo-etching, and thereafter applied to the tube face. Examples of the method of producing the stripe filters to be used in the frequency separation system are set forth in Japanese Pat. Publication No. 1448/1971 and Japanese Pat. Publication No. 16182/1971.

Now, various arrangements of the face plate member of the tube usable in the phase separation system will be described with reference to FIG. 4 and 5.

Figure 4:
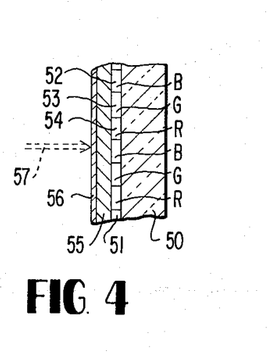
FIGS. 4, 5 and 6 are schematic views of exemplary arrangements of the face plate member of the cathode-ray tube of the type wherein a detected signal is processed in accordance with a phase separation technique.

In FIG. 4, a three-color separating stripe filter layer 51 is provided inside the glass face of the face plate 50, which consists of a repetitive series of parallel three color separating stripe filters arranged in a direction crossing the horizontal scanning direction of an electron beam 57. The color separating stripes comprise here blue stripe filters 52 transmitting blue light, green stripe filters 53 transmitting green light, and red stripe filters 54 transmitting red light. Overlying the layer 51, a phosphor layer 55 is applied which emits short-duration white light, and an aluminum back layer 56 is further provided.

Figure 5:
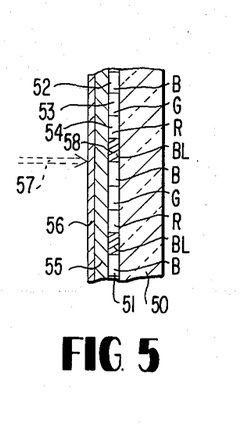

FIG. 5 shows another structure which includes black stripe pieces 58 provided in order to generate an index signal to thereby ensure phase separation.

In FIG. 5, the black stripe pieces are disposed between sets of blue, green and red stripe filters and, when the phosphor layer 55 is caused to emit light by means of the horizontal scanning of the electron beam 57, the raster spot varies in chromaticity in the order of blue, green, red, no output, blue, green, and so on. When the spot transverses the black stripe pieces 58 the light output becomes zero and, thus, the detection of phase can be effected by use of the index signal reflecting the described no-output times. Alternatively, it is also effective to interpose stripe pieces transmitting high level white light between the sets of three color separating stripe filters in order to generate the index signal.

As a modification of the structure of the face plate member of the cathode-ray tube adapted for the phase separation system, it is also possible and effective to provide color phosphor stripe pieces in place of the color stripe filters and the white phosphor layer.

Figure 6:
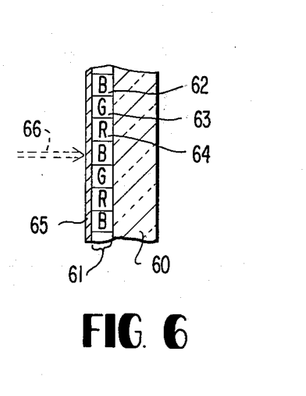

FIG. 6 shows one example of this modification, wherein a phosphor stripe layer 61 consists of a number of sets of blue phosphor stripe pieces 62, green phosphor stripe pieces 63, and red phosphor stripe pieces 64 arranged in side-by-side abutment and emitting in response to the electron beam 66, respectively, blue, green and red light. The phosphor stripe layer 61 is provided on face plate 60. An aluminum back layer 65 is coated on the phosphor stripe layer 61. As occasion arises, stripe pieces for the generation of an index signal may be added. Since the above cathode-ray tube is used as a flying-spot scanner, it is very important that these stripe phosphors have mutually identical short emission and duration time characteristics. The duration time is preferably one micro second and it is required that the characteristics of the three stripe phosphors be equal in time. As for combinations of the phosphors, we can use P-36 (blue), P-16 (blue green) or P-24 (light green), and P-24 (light green). The expression "P" defines a characteristic phosphor and is defined by the Radio Manufacturers' Association of America.

Figures 7, 8, 9, 10:
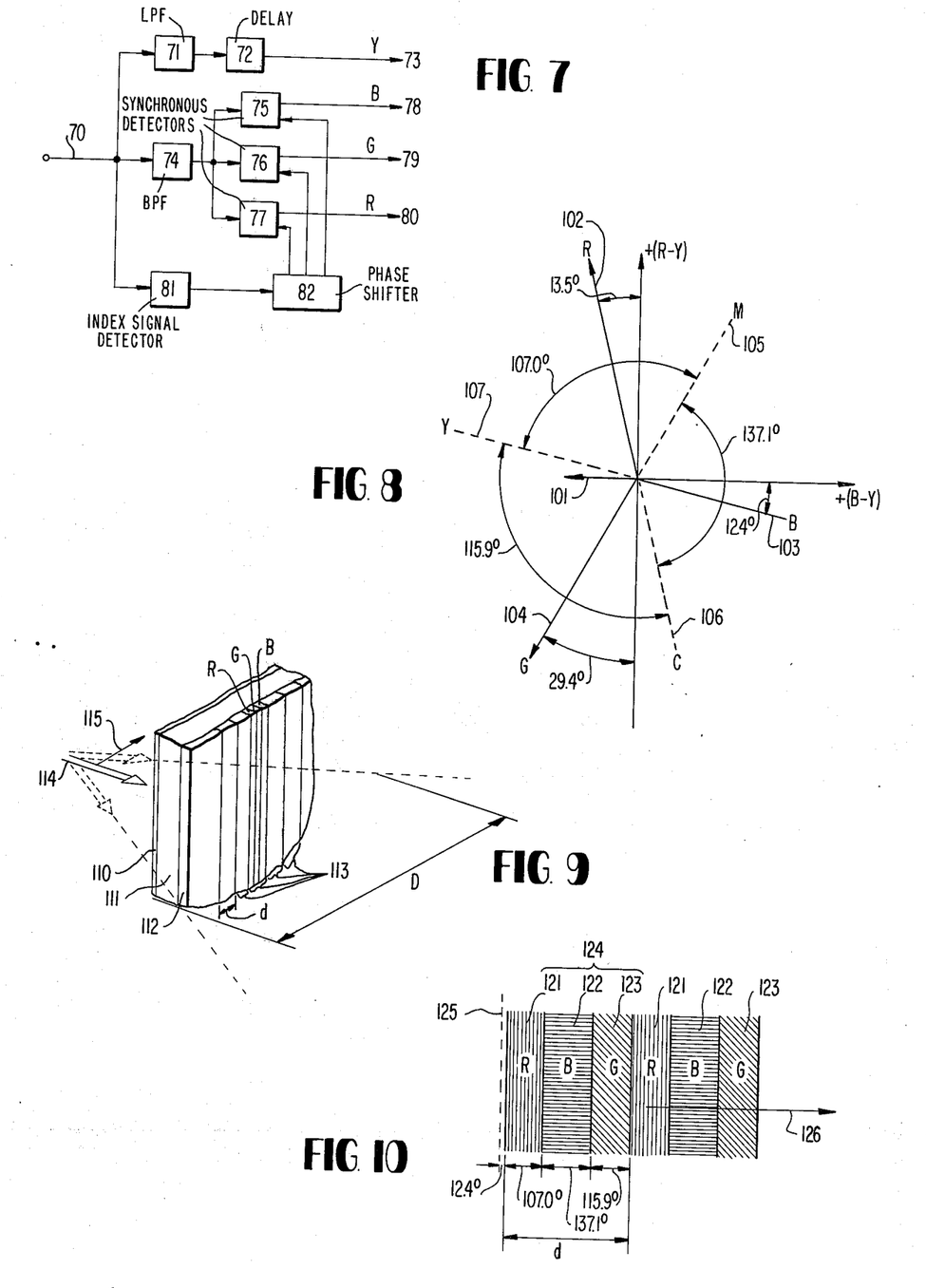
FIG. 7 is a block diagram of an exemplary chrominance signal separating circuit employed in the phase separation system.
FIG. 8 is a vector diagram of the chrominance subcarrier signal of the NTSC color television system.
FIGS. 9 and 10 are perspective and schematic plan views of an exemplary arrangement of the face plate member of the cathode-ray tube employed in a second embodiment as shown in FIG. 13 of the color television signal generator according to the present invention.

FIG. 7 shows a phase separating circuit. The composite signal 70 obtained by the photo detector 8 of FIG. 1 is applied to a low-pass filter 71 and a band-pass filter 74 whereby a signal representative of brightness and a signal representative of color are separated and obtained. The signal representative of color has been annexed to the color carrier frequency determined by the stripe's width, the raster horizontal scanning frequency and the raster width, so it can be separated from other signal components by the band-pass filter. For example, in the case of a 3-inch cathode-ray tube having a raster size of 53.6 × 40.2 mm, a color carrier frequency of 6.5 MHz can be obtained by the use of blue, green and red stripe pieces each having a width of 52 microns. In the above example, the low-pass filter 71 for separation of the brightness signal may be designed so as to pass frequencies not higher than about 5 MHz and the band-pass filter 74 may be designed so as to pass frequencies of 6.5 ± 0.5 MHz.

The output of the low-pass filter 71, i.e., 5 MHz signal, is applied to a delay circuit 72 whereby it becomes a Y signal 73, representative of brightness, which has a high resolving power. The chrominance signal separated by the band-pass filter 74 is simultaneously supplied to synchronous detectors 75, 76 and 77. On the other hand, the index signal is separated by an index signal detecting circuit 81 and regulated to become identical to the color carrier frequency. According to the circuit arrangement shown, the frequency of the index signal is adjusted to be 6.5 MHz and it is applied to a phase shifter 82 to obtain phase-shifted signals that are applied to the detectors 75, 76 and 77. Thus, outputs 78, 79 and 80 of the respective synchronous detectors are, respectively, blue, green and red video signals.

A second embodiment of the present invention will now be described. The second embodiment differs from the first embodiment mainly in that it is devoid of the chrominance signal separating circuit and NTSC color encoder, thereby directly providing the NTSC color television signal from the photoelectric converter.

In greater detail, a specially designed cathode-ray tube is employed as the flying-spot scanner and the color encoder, whose spot regularly varies in chromaticity and intensity so that the color light components of the light emitted from the tube face have a frequency, phase and intensity corresponding substantially to those of the corresponding color signal components of the ideal chrominance subcarrier signal of the NTSC color television system, thereby directly providing a color video signal identical to the NTSC color television signal from color films and documents without the use of any special signal processing circuit downstream of the signal photoelectric converter.

In the standard color television system, the Y signal representative of brightness and the color difference signals I, Q are derived from red, green and blue color signals generated by the television camera taking into account color balance. The Y signal is transmitted through an amplitude-modulation of the main video signal carrier. On the other hand, the chroma signals (I and Q signals) give quadrature modulation to the chroma signal subcarrier of 3.579545 MHz and also amplitude modulation of the carrier and are transmitted by both side bands. FIG. 8 is a vector diagram of the chrominance subcarrier signal of 3.579545 MHz. In the vector diagram, the amplitude of the chroma signal corresponds to the color purity (saturation) of the reproduced color and the phase relates to the dominant wavelength (hue) of the color.

Specifically, in FIG. 8, vectors 102, 103 and 104 represent, respectively, red, blue and green positions relative to the reference position of a color burst signal 101. Taking into consideration the color balance, the relative amplitudes of red, blue and green are specified, respectively, as 0.632, 0.447 and 0.593. FIG. 8 illustrates further vectors 105, 106 and 107 corresponding, respectively, to magenta, cyan and yellow.

According to the second embodiment of the present invention, the color signals and brightness representing signal depicted in the chrominance subcarrier vector diagram can be directly produced by the use of a flying-spot scanner including a novel cathode-ray tube which has a specifically designed color emitting face plate member, as described hereinafter.

FIG. 9 shows an exemplary arrangement of a fluorescent face of such a cathode-ray tube. An electron beam 114 is deflected so as to horizontally scan in the direction of the arrow 115. A stripe color filter layer 112 is intimately adhered onto a white phosphor layer 111 which is provided with a aluminum back layer 110. The white phosphor layer can be produced by applying a phosphor substance on the tube face which has a very short duration and an emission distribution characteristic extending over the whole visual range of light adapted to generate the color flying spot. A typical example of such a phosphor material is "P-24" phosphor. It is of course possible to mix two or more kinds of phosphors at a proper ratio to improve the color reproduction property.

As schematically shown in FIG. 9, a number of sets 113 of red, blue and green stripe filter pieces are arranged in a direction crossing the electron beam scanning direction 115. In response to the application of the electron beam, the white phosphor luminesces and generates the spot but, because the color filter unit is provided as above, one can see only the color light transmitted through the filter on the outside of the cathode-ray tube face. The above tube is identical in structure to a conventional cathode-ray tube except for the arrangement of the fluorescent screen. Since the electron beam is horizontally scanning as is the case in a television device, the spot varies in chromaticity with time due to the color stripe filters. The order of arrangement and the width of the color stripe filters are designed so that the frequency and phase of the respective color light of the flying spot are substantially identical to those of the corresponding color signal components of the ideal chrominance subcarrier. The frequency (fc) of color variation is calculated by the horizontal deflection width D on the fluorescent face of the cathode-ray tube, the pitch $d$ of the color stripe filters, and the horizontal scanning frequency $f_H$ in accordance with the following equation:

$$fc = \frac{D/\alpha}{d} \times f_H \qquad (2)$$

where $\alpha$ is the ratio of the effective horizontal scanning time (exclusive of the horizontal retrace period) to the total scanning time.

If the color variation frequency is taken to be 3.58 MHz, which is the chrominance subcarrier frequency of the NTSC system, the pitch $d$ of the color filters will be determined in accordance with equation (2) above when the size of the cathode-ray tube is given.

In a first example, the color stripe filters of each filter set are arranged so as to have the phase relationship indicated in the vector diagram of FIG. 8. FIG. 10 is an enlarged schematic view of the color stripe filters whereby their positional relationship and relative width will be seen. Reference numerals 121, 122 and 123 designate, respectively, red, blue and green stripe filter pieces where three different adjacent color stripe filter pieces form one filter set 124. A number of color stripe filter pieces are arranged in a direction crossing the horizontal electron beam scanning direction 126. The relative width each of the color stripe filter pieces can be calculated from the chrominance subcarrier signal vector diagram shown in FIG. 8. That is, the red, blue and green filter pieces are to have widths proportional, respectively, to 107.0°, 137.1° and 115.9°. The size of each stripe filter piece on the cathode-ray tube can be determined in accordance with the foregoing relationship and equation (2).

The desired transmissivity or transparency of each stripe filter element will be calculated taking into consideration the spectral emission distribution characteristic of the white phosphor in a manner that the ratio of red to blue to green will be 0.63: 0.45:0.59, as illustrated in FIG. 8. For example, consider a 3-inch cathode-ray tube having an effective raster size of 48 mm × 35 mm (namely, D = 48 mm). Assuming that the horizontal scanning frequency $f_H$ = 15.75 KHz, the chrominance subcarrier frequency fc = 3.58 MHz, and $\alpha$ = 0.83, then, the pitch $d$ of the stripe filter pieces can be calculated in accordance with equation (2) as follows:

$$d = \frac{f_H}{fc} \times \frac{D}{\alpha} = \frac{15.75}{3.58 \times 10^3} \times \frac{48}{0.83}$$
$$= 0.254 \text{ mm}$$
$$= 254 \text{ microns.}$$

Thus, in the case of a 3-inch cathode-ray tube as described, the widths of the red, blue and green filters become, respectively, 254 × 107/360 = 76 microns, 97 microns and 81 microns. This type of cathode-ray tubes generally has a beam diameter of 60 microns, so that even when the peripheral shading-off effect is taken into consideration, each color stripe filter piece can be dissected and a half-tone color hue generated when the beam spot extends over two kinds of adjacent stripe filter pieces can also be reproduced.

In a second example of the second embodiment, the filter unit is made of a repetitive series of parallel color stripe filter pieces of red, magenta, blue, cyan, green and yellow to produce a spot whose color varies regularly so that the frequency, phase and intensity of each color light component correspond substantially to those of the corresponding color signal component of the ideal chrominance subcarrier signal of the NTSC color television system. Further, in order to obtain a color burst signal, there are provided about eight to ten opaque and transparent stripe pieces with the same repetition frequency as that of the above sets of the color stripe filter pieces close to the beginning edge of the color stripe filter layer on the fluorescent face of the cathode-ray tube. In the above, it is also possible to provide an internal color phosphor layer consisting of stripe color phosphor pieces arranged to give an identical color variable spot, in place of the dual color separating filter and white phosphor layers.

Figures 11, 12, 16A, 16B:
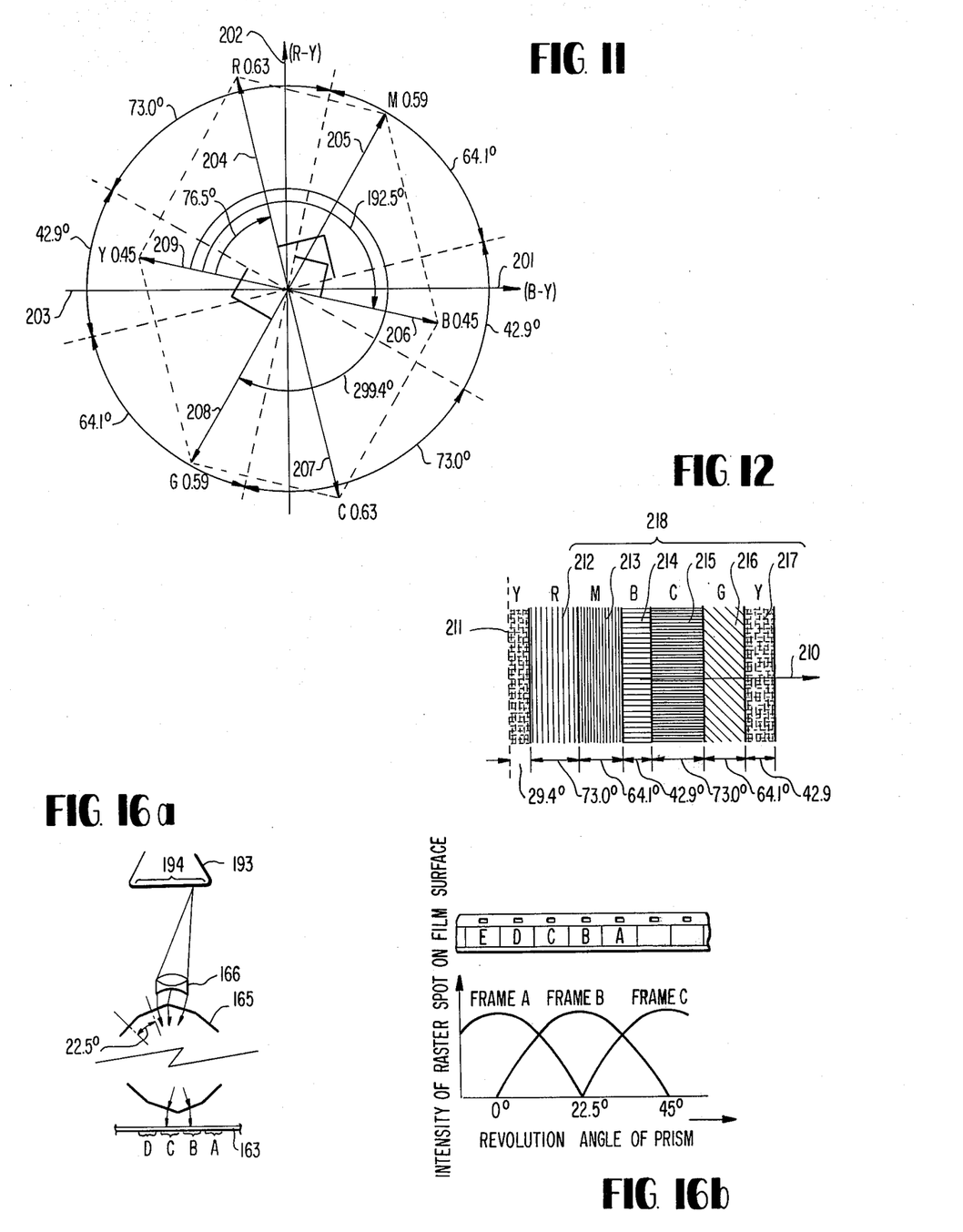
FIG. 11 is a vector diagram similar to FIG. 8.
FIG. 12 is a schematic view of an exemplary arrangement of the face plate member of the cathode-ray tube also employed in the second embodiment shown in FIG. 13 for generation of a color signal substantially identical to the chrominance subcarrier signal of the NTSC color television signal.
FIGS. 16a and 16b are explanatory views showing the technique of frame conversion from a movie film to a television image.

FIG. 11 is a vector diagram similar to that of FIG. 8 but for the chrominance subcarrier signal employed in the NTSC color television system, in which the abscissa 201 is the color difference signal (B-Y), the ordinate 202 is another color difference signal (R-Y), and reference numeral 203 designates the direction of the color burst signal. In the diagram, the phase corresponds to the dominant wavelength (hue) and the relative amplitude corresponds substantially to the color purity (saturation). That is, vector directions 204, 205, 206, 207, 208 and 209 represent, respectively, red, magenta, blue, cyan, green, and yellow, whose respective relative amplitude are 0.63, 0.59, 0.45, 0.63, 0.59 and 0.45.

FIG. 12 is an enlarged view of one set 218 of the color stripe filter pieces included in the cathode-ray tube according to the present invention. As shown, these color stripe filter pieces are arranged in a direction crossing the horizontal scanning direction 210 of the electron beam. Particularly, the arrangement direction shown in FIG. 12 is normal to the scanning direction, and each set of the stripe filter pieces consists of red, magent, blue, cyan, green and yellow color stripe filter pieces designated, respectively, by numerals 212, 213, 214, 215, 216 and 217.

The order of arrangement and relative stripe width shown in FIG. 12 are selected to correspond to the phase relationship depicted in the chrominance subcarrier signal vector diagram of FIG. 11. It will be seen that the red filter piece is disposed in the position of 29.4° with respect to position 211 of the color burst signal, and a number of the color stripe filter sets 218 will be provided which are arranged in a direction crossing the horizontal scanning direction. Thus, when a horizontal scanning as is employed in general television systems is started in the thus constructed cathode-ray tube, the chromaticity of the flying spot will be varied by the filter sets at a repetition frequency substantially equal to the chrominance subcarrier frequency (about 3.58 MHz) of the NTSC system. In the NTSC color television system. the transmissivity of the red, magenta, blue, cyan, green and yellow filter pieces are designed upon considering the emission spectrum of the white phosphor substance so that the ratio of overall emission intensity of color light is 0.63 : 0.54 : 0.45 : 0.63 : 0.59 : 0.45, respectively.

Figure 13:
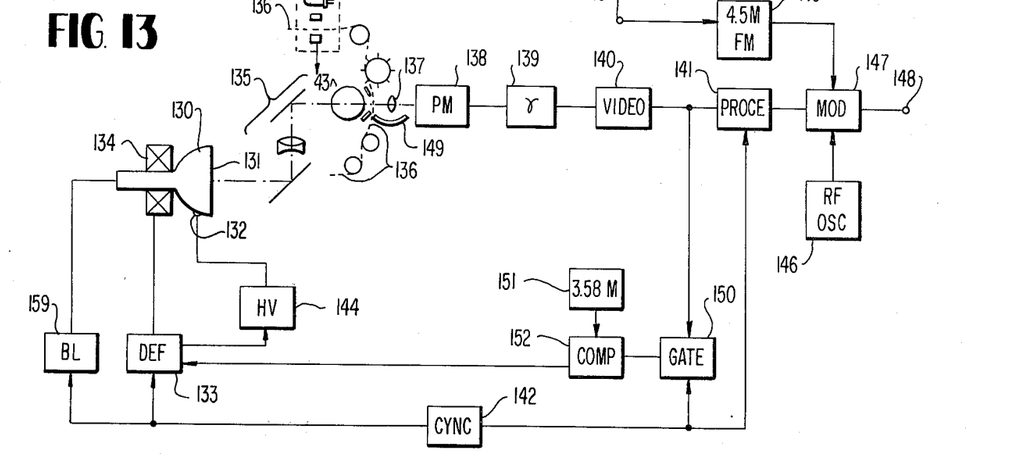
FIG. 13 is a block diagram of the second embodiment of the color television signal generator according to the present invention adapted for the reproduction of color movie films.

FIG. 13 shows a second embodiment using a flying-spot scanner to generate a color television signal from color movie films according to the present invention. The process of generating the color television signal from movie films involves two major techniques of color signal generation and frame conversion. Hereinafter, an exemplary inexpensive simple system adapted for general consumer use will be described.

In FIG. 13, a cathode-ray tube 130 includes an integral fluorescent face 131 having a color stripe filter layer as illustrated in FIGS. 9, 10 and 12 to generate the color spot. A vertical and horizontal deflection circuit 133 and a deflecting coil 134 generate the television raster, and a lens system 135 focuses the raster image on a color film medium 136. In operation, the chromaticity of the spot on the cathode-ray tube face varies regularly as noted above. The light transmitted through the color film medium 136 is fed through a focussing lens 137 to a photo detector 138 which must have about the same spectral sensitivity over the whole visual range. The photoelectrically converted signal from detector 138 is the input to a video amplifier 140, and it may be passed through a gamma correcting circuit 139, if necessary, and then added in a composite video signal processor 141 to a synchronizing signal from a synchronizing signal generator 142. Thus, the output video signal from the processor 141 is identical to the NTSC color television signal carrying the color information of an image on the film 136. The video signal is then added to an aural signal 143, which would be provided by an aural signal detector section 153 and which has, e.g., been frequency-modulated at 4.5 MHz by an FM modulator 145, the mixed signal is modulated at the modulator 147 by an unoccupied-TV channel's frequency generated by an oscillator 146 and applied to an output terminal 148. If this output signal is coupled to an antenna terminal of a general color television receiver, one can see a television image that is a reproduction of the color film scene.

Vertical and horizontal drive signals from the sychronizing signal generator 142 are applied to the deflection circuit 133 to excite the deflecting coil 134 in order to effect line scanning. The system shown in FIG. 13 further includes a blanking circuit 159 and a high-voltage generating circuit 144 which supplies high voltage to an anode 132 of the cathode-ray tube to accelerate the electron beam.

In the system shown in FIG. 13, in order to insure that the spot on the cathode-ray tube face varies in chromaticity in a stable manner at a predetermined chrominance subcarrier frequency (about 3.58 MHz), black and white stripes parallel to and with the same pitch as that of the color stripe filters are provided in the beginning section of the horizontal scanning of the stripe filter layer to generate a color burst signal of about 8 to 10 cycles. The light from the spot modulated by the black and white stripes is led by means of a lens system 135 and a light guide 149 to the photodetector 138 without reaching the color film 136, and becomes a part of the output of the video amplifier 140 together with the signal representative of the light transmitted by the color film. The output of the video amplifier 140 is then gated by a horizontal blanking signal from the synchronizing signal generator 142 to derive therefrom a signal portion corresponding in time to when the black and white stripes are horizontally scanned. The derived signal portion is compared with the color burst signal from the chrominance subcarrier generator 151 (generating a frequency of about 3.58 MHz) in a comparator 152 and, if a difference is detected, the resulting difference signal is fed back to the deflection circuit 133 whereby the horizontal deflection width of the raster is controlled to give the color burst signal of 3.58 MHz. As will be noted from equation (2), the chroma carrier frequency fc is determined by the horizontal scanning frequency $f_H$, the raster width D and the pitch d of the stripes. Specifically, because parameters $f_H$ and d are fixed, regulation of fc is effected by varying the raster width D.

Due to the above feedback network, the frequency of the chrominance subcarrier during one horizontal scanning period is stabilized. The above effect will also similarly be obtained by detecting the light from the light guide 149 by means of another photo detector different from the detector 138 to generate the color burst signal and by applying the color burst signal to the video amplifier 140 and the gate circuit 150.

Figures 14, 15:
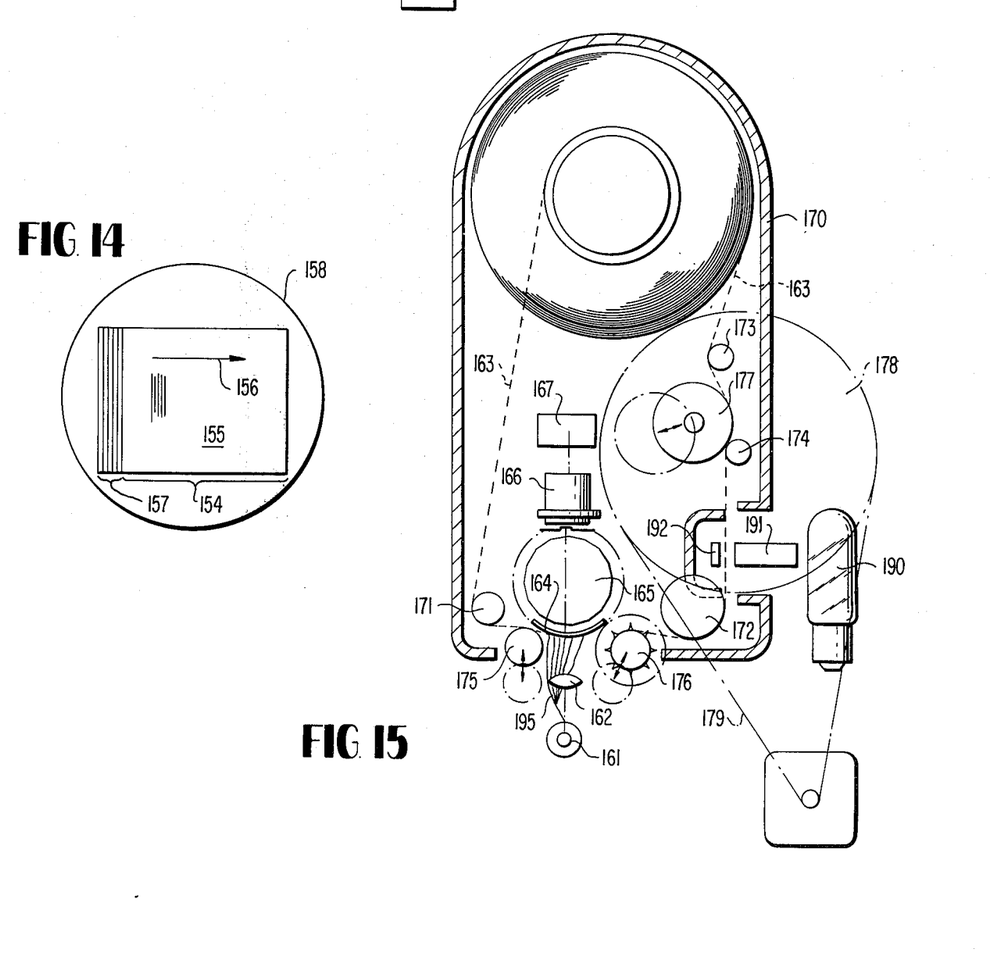
FIG. 14 is a simplified view of the tube face of the cathode-ray tube employed in the system shown in FIG. 13.
FIG. 15 is a simplified view showing the general mechanisms and associated elements of the system illustrated in FIG. 13 with a movie film loaded in a magazine.

FIG. 14 shows an exemplary arrangement of the stripe filters on the cathode-ray tube face employable in the second embodiment described above. In this drawing, a color stripe filter layer 154 is internally provided on the fluorescent face of the cathode-ray tube 158 and in the layer 154 a series of color filters 155 are arranged in the manner as described in connection with FIGS. 9, 10 and 12.

About eight to 10 black and white stripes 157 are disposed outside and close to the beginning section of horizontal scanning of the color filter layer 154, and harmonized with the same to generate the color burst signal. In FIG. 14, the black and white stripes for the color burst signal and the color stripe filter pieces are arranged in a direction normal to the scanning direction 156 of the electron beam.

In the NTSC color television system, the chrominance subcarrier frequency is selected to be an odd multiple of half of the horizontal scanning frequency (or, an odd multiple of half of the vertical scanning frequency), so that the phase of the chrominance subcarrier is spatially inverted between adjacent scanning periods and between successive frames in connection with the same scanning line in respective frames. Generally, it is very difficult to generate the chrominance subcarrier signal by use of color stripe filters due to difficulties encountered in obtaining a desired degree of accuracy and control of deflection of the electron beam, so, to produce a serviceable device, as shown in FIG. 14, the respective stripe pieces are arranged in a direction crossing normally the horizontal scanning direction, and the frequency of the chrominance subcarrier is selected to be an integral multiple of the horizontal scanning frequency and to be approximately the frequency (3.579545 MHz) of the chrominance subcarrier employed in the NTSC system.

Now, one exemplary provision of frame conversion from a movie film picture to a television image will be described. As is well known in the art, since the television frame rate is 30 frames per second or 60 fields per second and the frame rate for movie film is 24 frames per second, in order to generate a television signal from movie film a frame conversion process is necessary to make two frames of the movie film correspond to five frames of the television. As a result, the troublesome problem occurs that pull-down of the film must be performed rapidly during the vertical blanking period of the television. The pull-down mechanism of a conventional movie projector is not adapted to effect such rapid pull-down action. Further, in the case of 8-mm films, frame conversion is more difficult because the feed rate of the film is 18 frames per sec or 16 frames per sec. The present invention solves the afore-mentioned problem by the use of a rotary multi-sided prism together in combination with a movie film magazine.

FIG. 15 shows an optical system with a film magazine disposed in color television signal generator for movie film as shown in FIG. 13. Light of the spot generated by a cathode-ray tube is reflected by a reflecting mirror 167 and focused on a movie film 163 after passed through a projecting lens system 166, a multi-sided prism 165 and an aperture 164. The transmitted light is led by a focussing lens 162 to a photodetector 161 whereby it is converted to an electric signal. The signal is then processed in the manner as noted hereinabove.

The mechanism shown in FIG. 15 includes an endless film magazine 170, guide rollers 171, 172, and 173 mounted on the magazine, a capstan 174, a roller 175 on the player, a sprocket 176 on the player, and an idler roller 177. The player site roller 175, sprocket 176 and idler roller 177 are shifted to the respective dotted line positions shown when the magazine 170 is inserted to prevent them from interfering with the film 163, and therafter returned to the solid line positions to feed the film. An exciter lamp 190 emits light which is led through a focusing lens 191 to a photocell 192 whereby playback of the aural optical record is achieved. The resulting aural signal is coupled to the terminal 143 of FIG. 13. A fly-wheel 178 positioned coaxially with the capstan 174 is driven by a motor through a belt 179.

The multi-plane or polygonal prism 165 is mounted rotatably about its centeraxis in synchronism with the advancement of the movie film and positioned so that the focused light will pass the center thereof. The minimum number of the sides used in the multi-plane prism is 4, preferably 12 to 24 for eliminating flickers. The aperture 164 is so dimensioned that its width is two or more times one film frame length to simultaneously project two or more scenes of the movie film 163. Thus, as shown in FIG. 16a, in the case of a 16-sided prism, a raster image 194 of a cathode-ray tube 193 is focused on two successive film frames.

According to the above arrangement, the flying spot is focused on mutually corresponding points in the two successive frames of the movie film 163 irrespective of the feed rate or the frame rate of the film. The degree of brightness at the focused points changes with the angle of revolution of the multiside prism as shown in FIG. 16b. Therefore, by the use of the multi-sided prism rotating in synchronism with the movie film, the field rate of the television raster of the cathode-ray tube becomes independent of the frame rate of the movie film. This gives a remarkable advantage in reproducing a movie film in the form of a television image. That is, the movie film picture with a feed rate of 24 frames per sec can be transformed to a television image having a predetermined frame rate or field rate, and stop motion images and slow motion images can also be reproduced on the television screen as desired. The above substantially-limitless mode of operation according to the present invention cannot be achieved in conventional rapid pull-down and intermittent feed systems.

As heretofore described, in order to optically detect the color burst light caused by the black and white stripes provided in the cathode-ray tube, a light guide 195 such as optical fiber is disposed extending from one side edge of the film gate 164 between the multi-plane prism 165 and the movie film 163 to the photodetector 161. Thus, the color burst signal is obtained by the photodetector 161 which also generates the video signal. The thus obtained color burst signal is added as the general burst signal to the back-porch portion of the horizontal synchronizing pulse of the video signal and used, after being separated from the other components by a gate means, to stabilize the chrominance subcarrier.

The present invention utilizes as the flying-spot scanner a novel cathode-ray tube, which is capable of coding the color signals and operates as a flying generator, and directly generates by use of a single photo detector and a signal video amplifier means a signal analogous to the NTSC color television signal. Further, by the use of a film magazine and a rotary multiplane prism mechanism the present invention effects limitless frame conversion.

Although a system to reproduce a television signal from movie film was described above, the present invention can also be used in the reproduction of color slides, color prints and the like having static pictures.

As described above, according to the present invention a small, light-weight, inexpensive device for generating a color television signal from color films and the like can be provided which gives a high power of resolution without extremely narrowing the stripe's width because the stripes are mounted on a relatively wide face plate of the cathode-ray tube. Particularly, in the frequency separation system, the band width can be expanded sufficiently so that it is possible to remakably enhance the resolving power and color reproduction property. Because the stripe's width is relatively large, the cathode-ray tube employed in the present invention can be easily manufactured.

Further, the present device has no need for the conventional bulky three color separating optical system, but employs a single photoelectric converter, so that is can be manufactured compactly, lightly and extremely inexpensively. In operation of the present device, no light source is necessary which generates heat or infrared rays, so substantial causes which harmfully affect the color film medium are lacking and color degradation of the film is prevented with the result that long play can be achived.

While the invention has been described in detail and with reference to specific embodiments thereof, it will be apparent to one skilled in the art that various changes and modification can be made therein without departing from the spirit and scope thereof.

What is claimed is:

1. A color television signal generator comprising: a means for scanning a colored image area with a flying spot of light which is emitted from a cathode-ray tube whose face plate member includes a stripe layer of repetitive series of parallel different color stripes arranged in a direction crossing the scanning direction of an electron beam in said cathode-ray tube, said flying spot of light varying in chromaticity due to the striped layer, and a single photoelectric converter arranged to receive light from said colored image area and generating a color television signal therefrom.

2. A color television signal generator as specified in claim 1 further including a gramma correcting circuit and a color correcting circuit.

3. A color television signal generator as specified in claim 1 wherein the color recording medium to be imaged is a movie film, and the apparatus further includes a rotary multiplane prism for conversion of the movie film frame rate to a television image.

4. A color television signal generator as specified in claim 1 further including an optical system for projecting the flying spot of light emitted from the face plate to the image area.

5. A color television signal generator as specified in claim 1 wherein said stripe layer comprises a white phosphor layer and a color separating filter stripe layer on said white phosphor layer as said color stripes to emit said flying spot of light.

6. A color television signal generator as recited in claim 5 wherein said color separating filter stripe layer comprises a repetitive series of parallel color filter stripes of red, blue and green.

7. A color television signal generator as specified in claim 1 further including a chrominance signal separating circuit for processing the output of said converter to provide separated color signals.

8. A color television signal generator as specified in claim 7 wherein said cathode-ray tube has a force plate member which includes a white phosphor layer and a color separating filter stripe layer on said white phosphor layer, said filter stripe layer including at least two layered sections, each layered section consisting of a repetitive series of parallel color filter stripes arranged in a direction crossing the horizontal scanning direction of the electron beam, said chrominance signal separating circuit being constructed so that it separates the converter output in terms of frequency.

9. A color television signal generator as specified in claim 8 wherein a first layered section of said filter stripe layer consists of a repetitive series of parallel cyan filter stripes and transparent stripe pieces, and a second layered section consists of a repetitive series of parallel yellow stripe pieces and transparent stripes having a pitch different from that of said first layered section, whereby said first layered section transmits and cuts off red light at a predetermined frequency and said second layered section transmits and cuts off blue light at another predetermined frequency in response to horizontal scanning of the electron beam.

10. A color television signal generator as specified in claim 7 wherein the face plate member of said cathode-ray tube includes a white phosphor layer and a three color separating filter stripe layer on said white phosphor layer, said filter stripe layer comprising a repetitive series of parallel three-color filter stripe pieces arranged in a direction crossing the horizontal scanning direction of the electron beam, said chrominance signal separating circuit being constructed so that it separates the converter output in terms of phase.

11. A color television signal generator as specified in claim 10 wherein said a three-color separating filter stripe layer comprises further stripe pieces for generation of an index signal which stripe pieces are disposed between sets of three color filter stripes.

12. A color television signal generator as specified in claim 7 wherein the face plate member of said cathode-ray tube includes a three-color phosphor stripe layer, said phosphor layer comprising a repetitive series of blue, green and red phosphor stripes pieces arranged in a direction crossing the horizontal scanning direction of the electron beam, said chrominance signal separating circuit being constructed so that its separates the converter output in terms of phase.

13. A color television signal generator as specified in claim 12 wherein said three-color phosphor stripe layer further comprises stripe pieces for the generation of an index signal, which stripe pieces are disposed between sets of three color phosphor stripes.

14. A color television signal generator as specified in claim 1 wherein the face plate member of said cathode-ray tube includes color light emitting means for generating a chromatically variable flying spot on the tube face, the frequency fc of the color variation of the flying spot being determined in accordance with the following equation:

$$fc = \frac{D/\alpha}{2d} \times 15.75 \text{ KHz}$$

where $d$ is the width of one of said series of parallel different color stripes, $D$ is the horizontal deflection width on the cathode-ray tube face, and $\alpha$ designates the ratio of the effective scanning time to the total horizontal scanning time period, the frequency, phase and intensity of each emitted color corresponding to those of the corresponding color signal components of the NTSC color television chrominance subcarrier signal, whereby said converter output comprises a signal analogous to the NTSC color television signal.

15. A color television signal generator as specified in claim 14 wherein said color light emitting means further includes color burst zones disposed out of the raster area to generate a color burst signal equivalent to the NTSC color television signal, which comprises a set of color burst stripes parallel to the color stripes.

16. A color television signal generator as specified in claim 15 further including means for scanning side color burst zones and detecting a frequency difference between the color burst signal and a reference signal to thereby regulate the raster width on the tube face to obtain an accurate color carrier frequency.

17. A color television signal generator as specified in claim 14 wherein said color light emitting means comprises a white phosphor layer and a color separating filter stripe layer applied on said white phosphor layer, said filter stripe layer comprising a repetitive series of parallel color filter stripes of red, blue and green arranged in a direction crossing the horizontal scanning direction of the electron beam.

18. A color television signal generator as specified in claim 17 wherein said repetitive series of parallel color filter stripes further include magenta, cyan and yellow filter stripes.

19. A color television signal generator as specified in claim 14 wherein said color light emitting means includes a color phosphor stripe layer which comprises a repetitive series of red, blue, and green emitting phosphor stripes arranged in a direction crossing the horizontal scanning direction of the electron beam.

20. A color television signal generator as specified in claim 19 where said color phosphor stripe layer further includes magenta, cyan and yellow stripe phosphor stripes.

21. A color television signal generator as claimed in claim 14 further comprising a movie film driving mechanism and a rotary multi-plane prism for conversion of frame rate from a movie film to a television image.

22. A color television signal generator as claimed in claim 21 further comprising a light guide one end of which is optically opposed to a color burst zone on the cathode-ray tube and, the other end of which is optically opposed to a photodetector for generating a color burst signal.

23. A color television signal generator as specified in claim 1 wherein said stripe layer comprises a color phosphor stripe layer of a repetitive series of color phosphor stripes.

24. A color television signal generator as specified in claim 23 wherein said color phosphor stripe layer comprises a repetitive series of red, blue and green emitting phosphor stripes.

25. A color television signal generator as specified in claim 24 wherein said color phosphor stripe layer further comprises magenta, cyan and yellow emitting phosphor stripes.

26. A cathode-ray tube for emitting a flying spot of light and adapted for generation of a color-television signal from a color recording medium, having a face plate member including a striped layer of repetitive series of parallel different color stripes arranged in a direction crossing the scanning direction of an electron beam in said cathode-ray tube, said flying spot of light being chromatically variable due to scanning of said electron beam over said face plate member, the order of arrangement and widths of said different color stripes being such that the frequency, phase and intensity of each color light component of said flying spot of light corresponds substantially to those of the corresponding color signal component of the ideal chrominance subcarrier signal.

27. A cathode-ray tube as specified in claim 26 wherein said face plate member comprises a white phosphor layer and a color separating filter stripe layer applied on the white phosphor layer, said filter stripe layer consisting of a repetitive series of parallel dichroic filter stripes arranged in a direction crossing the horizontal scanning direction of the electron beam to thereby cyclically transmit selected color light towards the tube face in synchronism with the electron beam scanning.

28. A cathode-ray tube as specified in claim 26 wherein said face plate member comprises a repetitive series of color phosphor stripes arranged in a direction crossing the horizontal scanning direction of the electron beam.

29. A cathode-ray tube as specified in claim 26 wherein said face plate member is designed so that the flying spot changes in color, whereby emitted color light can be separated depending upon the difference in repetition frequency at which the same color occurs.

30. A cathode-ray tube as specified in claim 26 wherein said face plate member is designed so that the flying spot changes in color whereby emitted color light can be separated depending upon the difference in phase at which the same color repeatedly occurs.

31. A cathode-ray tube as specified in claim 26 wherein in said face plate member the flying spot of light regularly changes in color to red, blue and green in synchronism with the electron beam scanning said different color stripes being arranged in the order of red, blue and green with relative widths of 107.0°, 137.1° and 115.9°, respectively.

32. A cathode-ray tube as specified in claim 26 wherein in said face plate member the flying sot of light regularly changes in color to red, magenta, blue, cyan, green and yellow in synchronism with the electron beam scanning, said different color stripes being arranged in the order of red, magenta, blue, cyan, green, and yellow with the relative widths of 73.0°, 64.1°, 42.9°, 73.0°, 64.1°, and 42.9°, respectively.

* * * * *